(12) United States Patent
Asakura

(10) Patent No.: US 9,654,910 B2
(45) Date of Patent: May 16, 2017

(54) COMMUNICATION APPARATUS

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/227,356

(22) Filed: Aug. 3, 2016

(65) Prior Publication Data
US 2017/0041736 A1  Feb. 9, 2017

(30) Foreign Application Priority Data

Aug. 4, 2015  (JP) ................... 2015-154452

(51) Int. Cl.
*H04W 88/06* (2009.01)
*H04W 4/00* (2009.01)
*H04L 29/08* (2006.01)
*H04N 1/32* (2006.01)
*H04W 84/12* (2009.01)

(52) U.S. Cl.
CPC .......... *H04W 4/008* (2013.01); *H04L 67/104* (2013.01); *H04N 1/32101* (2013.01); *H04N 1/32593* (2013.01); *H04N 2201/0094* (2013.01); *H04W 84/12* (2013.01)

(58) Field of Classification Search
CPC ............................... H04W 88/06; H04W 88/04
See application file for complete search history.

(56) References Cited

U.S. PATENT DOCUMENTS

2009/0058636 A1* 3/2009 Gaskill .............. A61N 1/37282
                                                        340/539.11
2010/0272049 A1* 10/2010 Tung ..................... H04W 88/06
                                                        370/329
2014/0038517 A1   2/2014 Asakura

FOREIGN PATENT DOCUMENTS

JP        2014-032561 A     2/2014

* cited by examiner

*Primary Examiner* — Tuan H Nguyen
(74) *Attorney, Agent, or Firm* — Banner & Witcoff, Ltd.

(57) ABSTRACT

A communication apparatus may comprise a first wireless interface and a second wireless interface configured to establish a first type of wireless connection with an external apparatus, the first type of wireless connection being a connection where the communication apparatus operates as a client and the external apparatus operates as a server. The second wireless interface may be further configured to supply wireless information to the external apparatus using the first type of wireless connection, regardless of whether request information for requesting supply of the wireless information is obtained from the external apparatus. A controller may be configured to establish a particular wireless connection with the external apparatus via the first wireless interface using the wireless information after the wireless information is supplied to the external apparatus.

12 Claims, 9 Drawing Sheets

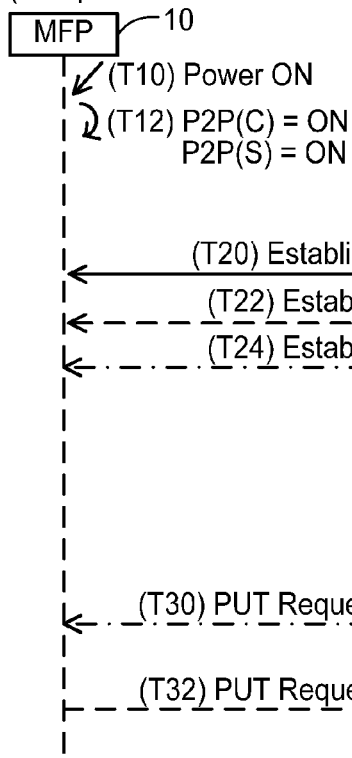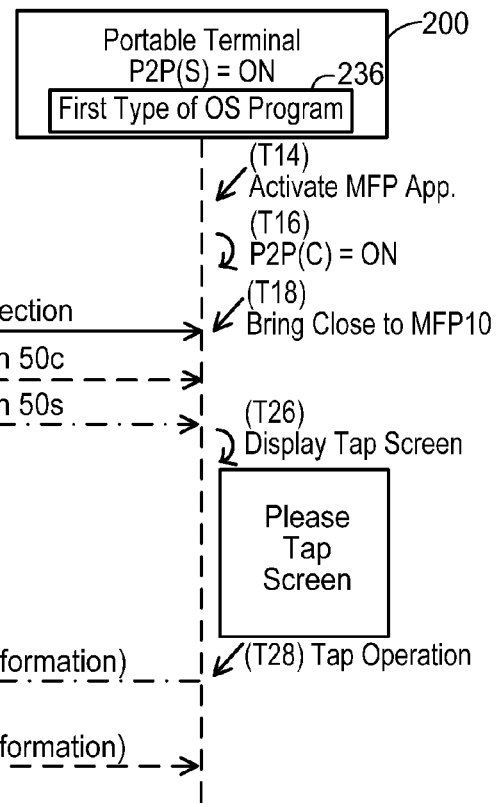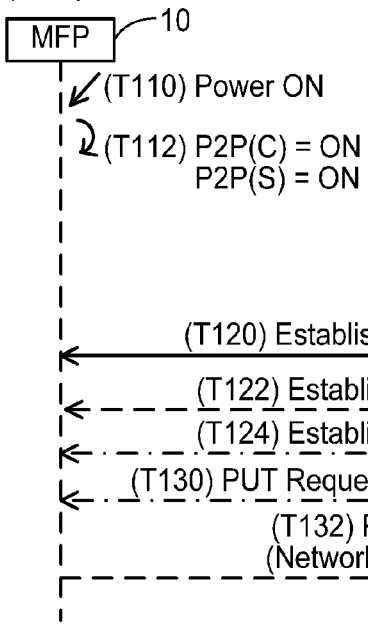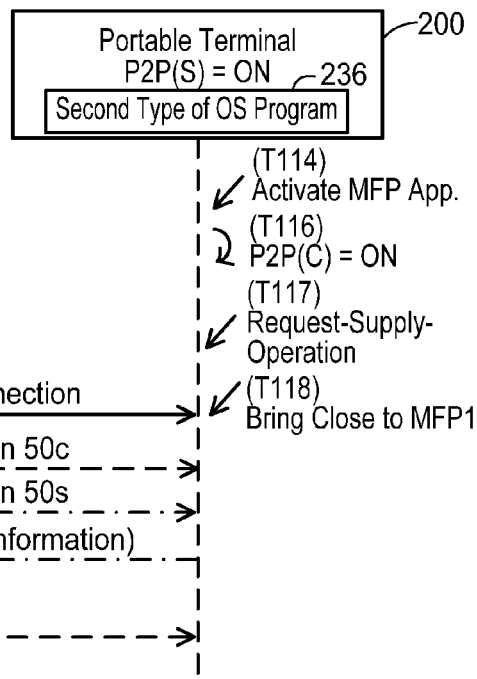
FIG. 2

(First Embodiment)

FIG. 5 (Second Embodiment)

(Second Embodiment) (Case B)

(Third Embodiment)

COMMUNICATION APPARATUS

CROSS-REFERENCE TO RELATED APPLICATION

This application claims priority to Japanese Patent Application No. 2015-154452, filed on Aug. 4, 2015, the entire contents of which are hereby incorporated by reference into the present application.

TECHNICAL FIELD

The present teachings disclose a communication apparatus for performing wireless communication with an external apparatus.

DESCRIPTION OF RELATED ART

An MFP (short for multi-function peripheral) provided with an NFC interface for performing wireless communication in accordance with a P2P (short for peer to peer) mode of an NFC (short for near field communication) standard is known. The MFP establishes, with a mobile terminal, two types of connections in accordance with SNEP (short for simple NDEF (NFC data exchange format) exchange protocol) that is related to the P2P mode via the NFC interface. One connection is for having the MFP operate as a server and the mobile terminal operate as a client. The other connection is for having the MFP operate as a client and the mobile terminal operate as a server. In addition, in a case of receiving print request data from the mobile terminal using the one connection, the MFP sends response data including a wireless setting to the mobile terminal using the other connection.

BRIEF SUMMARY

According to the technique described above, in order for the MFP to send the response data, the MFP must await reception of the print request data. The present disclosure provides a technique in which a communication apparatus may supply wireless information to an external apparatus without awaiting request information for requesting supply of the wireless information.

A communication apparatus disclosed herein may comprise: a first wireless interface; a second wireless interface being different from the first wireless interface and configured to: establish a first type of wireless connection with an external apparatus, the first type of wireless connection being a connection where the communication apparatus operates as a client in accordance with a particular protocol and the external apparatus operates as a server in accordance with the particular protocol; and after the first type of wireless connection with the external apparatus is established, supply wireless information to the external apparatus using the first type of wireless connection, regardless of whether request information for requesting supply of the wireless information is obtained from the external apparatus, the wireless information being for establishing a particular wireless connection via the first wireless interface; and a controller configured to establish the particular wireless connection with the external apparatus via the first wireless interface using the wireless information after the wireless information is supplied to the external apparatus.

Computer-readable instructions and a computer-readable storage medium storing the computer-readable instructions which realize the communication apparatus are also novel and useful. A method performed by the communication apparatus is also novel and useful. In addition, a communication system which includes the communication apparatus and the external apparatus described above is also novel and useful.

BRIEF DESCRIPTION OF DRAWINGS

FIG. 2 shows sequence diagrams of comparative embodiments X and Y.

DETAILED DESCRIPTION OF INVENTION

First Embodiment (Configuration of Communication System 2)

Figure 1:
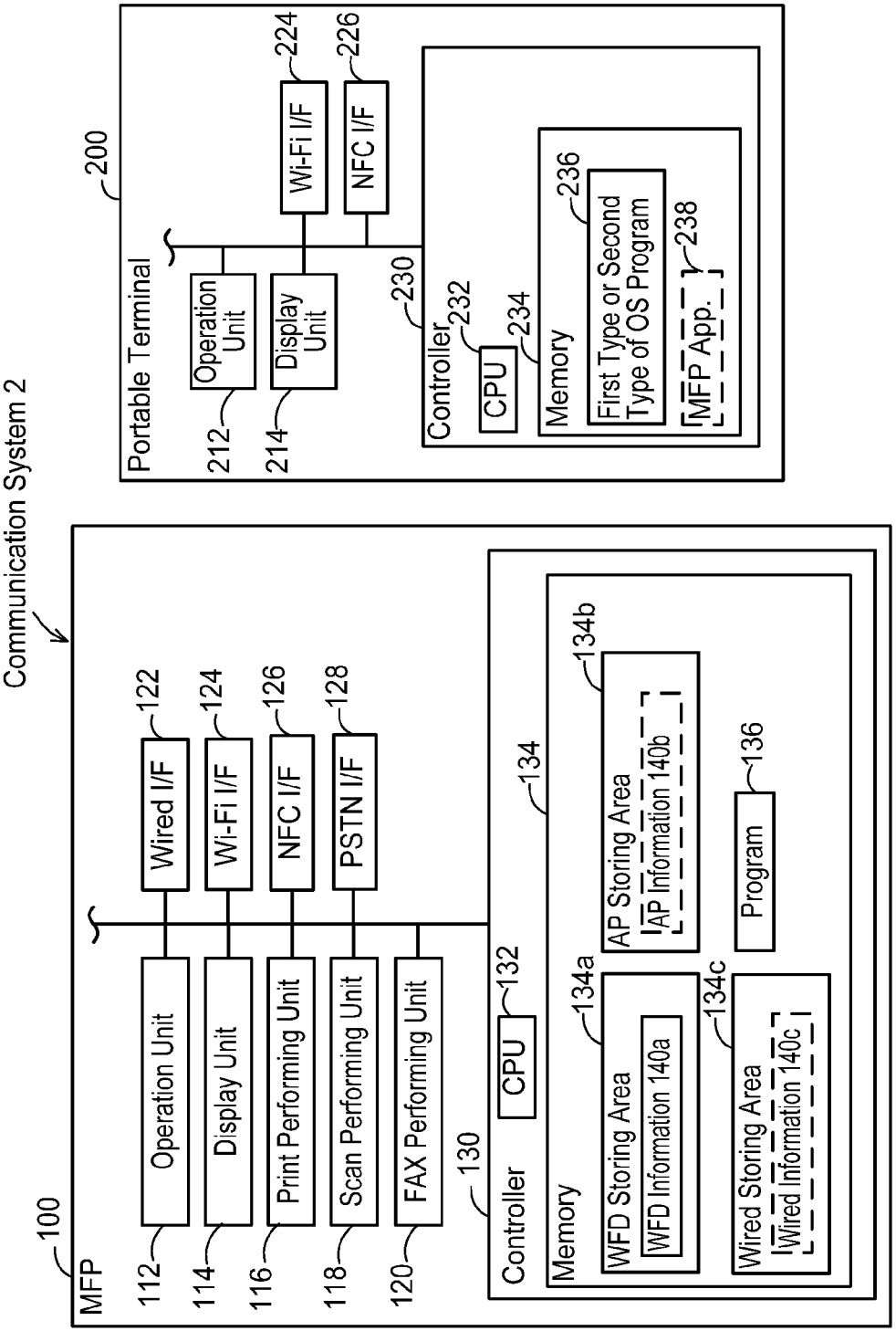
FIG. 1 shows a configuration of a communication system.

As shown in FIG. 1, a communication system 2 includes an MFP 100 and a mobile terminal 200. The MFP 100 and the mobile terminal 200 are respectively capable of performing wireless communication in accordance with the Wi-Fi standard (hereinafter, referred to as "Wi-Fi communication") and wireless communication in accordance with the NFC standard (hereinafter, referred to as "NFC communication").

(Configuration of MFP 100)

The MFP 100 includes an operation unit 112, a display unit 114, a print performing unit 116, a scan performing unit 118, a FAX performing unit 120, a wired interface (hereinafter, an interface will be described as an "I/F") 122, a Wi-Fi I/F 124, an NFC I/F 126, a PSTN (short for public switched telephone network) I/F 128, and a controller 130.

The operation unit 112 includes a plurality of keys. By operating the operation unit 112, a user can input various instructions to the MFP 100. The display unit 114 is a display for displaying various kinds of information. The print performing unit 116 is a printing mechanism adopting an inkjet standard, a laser standard, or the like. The scan performing unit 118 includes a scanning mechanism such as a CCD and a CIS. The FAX performing unit 120 includes hardware (for example, a modem) for performing FAX communication via a PSTN (short for public switched telephone network).

The wired I/F 122 is an I/F for performing wired communication. When a communication cable is connected to the wired I/F 122, the MFP 100 can belong to a wired network.

The Wi-Fi I/F 124 is an I/F for performing Wi-Fi communication according to the Wi-Fi standard. The Wi-Fi standard is a wireless communication standard which conforms to a standard formulated by the Wi-Fi Alliance and which is based on the 802.11 standard created by IEEE (short for the Institute of Electrical and Electronics Engineers, Inc.) or to equivalent standards thereof (for example, 802.11a, 802.11b, 802.11g, and 802.11n). In particular, the Wi-Fi I/F 124 supports the WFD (short for Wi-Fi Direct (registered trademark)) standard formulated by the Wi-Fi Alliance.

The NFC I/F 126 is a wireless I/F for performing an NFC communication in accordance with the NFC standard. The NFC standard is an international standard such as ISO/IEC 21481 or ISO/IEC 18092. The NFC I/F 126 comprises a chip which differs from that of the Wi-Fi I/F 124.

Known types of I/Fs for performing NFC communication include an I/F referred to as an NFC Forum Device and an I/F referred to as an NFC Tag. In the present embodiment, the NFC I/F 126 is an NFC Forum Device.

An NFC Forum Device is an I/F capable of selectively operating in any of a P2P mode, an R/W (short for Reader/Writer) mode, and a CE (short for card emulation) mode. For example, when both an NFC I/F of a first apparatus and an NFC I/F of a second apparatus operate in the P2P mode, the first and second apparatuses can perform bidirectional communication of data. In addition, for example, when the NFC I/F of the first apparatus operates in the Reader mode of the R/W mode and the NFC I/F of the second apparatus operates in the CE mode, the first apparatus can read data from the second apparatus or, in other words, the first apparatus can perform data reception from the second apparatus. Furthermore, for example, in a case where the NFC I/F of the first apparatus operates in the Writer mode of the R/W mode and the NFC I/F of the second apparatus operates in the CE mode, the first apparatus can write data into the second apparatus or, in other words, the first apparatus can perform data transmission to the second apparatus. Moreover, hereinafter, the respective modes may be described by omitting the term "mode". For example, the P2P mode may be simply described as "P2P".

Wi-Fi communication and NFC communication differ from each other as follows. Specifically, a communication speed (for example, a maximum communication speed of 600 Mbps) of Wi-Fi communication is higher than a communication speed (for example, a maximum communication speed of 24 Mbps) of NFC communication. In addition, a frequency (in 2.4 GHz band or 5.0 GHz band) of a carrier wave in Wi-Fi communication differs from a frequency (for example, in 13.56 MHz band) of a carrier wave in NFC communication. Furthermore, a maximum distance (for example, approximately 100 m) over which Wi-Fi communication can be performed is greater than a maximum distance (for example, approximately 10 cm) over which NFC communication can be performed.

The PSTN I/F 128 is connected to a PSTN (not illustrated) which is a public line. Specifically, one end of a communication cable for PSTN is connected to the PSTN I/F 128. The other end of the communication cable is connected to, for example, a PSTN socket in a household.

The controller 130 comprises a CPU 132 and a memory 134. The CPU 132 executes various processes in accordance with a program 136 stored in the memory 134. The memory 134 comprises a ROM, a RAM, a hard disk, or the like. The memory 134 comprises a WFD storing area 134a, an AP (short for access point) storing area 134b, and a wired storing area 134c.

The WFD storing area 134a is an area for storing WFD information 140a used in a WFD network when the MFP 100 operates as a parent station (in other words, a G/O (short for group owner)) of the WFD network. The WFD information 140a includes an SSID (short for service set identifier), a password, and a BSSID (short for basic service set identifier: in other words, a MAC address of the MFP 100). When power of the MFP 100 is turned ON, the MFP 100 constantly operates as a G/O of the WFD network. Therefore, while power of the MFP 100 is turned ON, the WFD information 140a is constantly stored in the WFD storing area 134a.

The AP storing area 134b is an area for storing AP information 140b used in an AP network formed by an AP in a case where the MFP 100 belongs to the AP network. The AP information 140b includes a BSSID (in other words, a MAC address of the AP), an IP address of the MFP 100, a subnet mask of the MFP 100, and an MAC address of the MFP 100.

The wired storing area 134c is an area for storing wired information 140c used in a wired network in a case where the MFP 100 belongs to the wired network. The wired information 140c includes an IP address of the MFP 100, a subnet mask of the MFP 100, and an MAC address of the MFP 100.

The program 136 includes an application program and a protocol stack. The application program is a program for performing a process in an application layer of an OSI reference model and the protocol stack is a program for performing a process in a lower layer than the application layer. The protocol stack includes programs for performing a process in accordance with the P2P mode of the NFC standard and a process in accordance with R/W of the NFC standard. The protocol stack may or may not include a program for performing a process in accordance with CE of the NFC standard.

Hereinafter, an apparatus capable of performing NFC communication (in other words, the MFP 100, the mobile terminal 200, and the like) will be referred to as an "NFC apparatus". P2P is, normally, a mode for performing bidirectional communication between a pair of NFC apparatuses. For example, in a state where each of a pair of NFC apparatuses operates in accordance with P2P, a logical link control protocol (LLCP) connection is first established between the pair of NFC apparatuses and, subsequently, an SNEP connection is further established. In an SNEP connection, one of the pair of NFC apparatuses operates as a server and the other operates as a client.

In a case where the state of one NFC apparatus is a state where an SNEP client function (hereinafter, referred to as "P2P (C)") is enabled and the state of the other NFC apparatus is a state where an SNEP server function (hereinafter, referred to as "P2P (S)") is enabled, an SNEP connection is established in order to have the one NFC apparatus operate as a client and the other NFC apparatus operate as a server. In particular, in a case where the state of one NFC apparatus is a state where both P2P (C) and P2P (S) are enabled and the state of the other NFC apparatus is a state where both P2P (C) and P2P (S) are enabled, both an SNEP connection in order to have the one NFC apparatus operate as a client and the other NFC apparatus operate as a server and an SNEP connection in order to have the other NFC apparatus operate as a client and the one NFC apparatus operate as a server are established.

In the present embodiment, while power of the MFP 100 is turned ON, the MFP 100 maintains a state where P2P (C) is enabled and P2P (S) is disabled. In addition, while power of the mobile terminal 200 is turned ON, the mobile terminal 200 maintains a state where P2P (S) is enabled and, furthermore, depending on the situation, changes from a state where P2P (C) is disabled to a state where P2P (C) is enabled. Therefore, an SNEP connection (hereinafter, referred to as a "connection 50c") in order to have the MFP 100 operate as a client and the mobile terminal 200 operate as a server may be established between the MFP 100 and the mobile terminal 200. However, since P2P (S) is disabled at the MFP 100, an SNEP connection (hereinafter, referred to as a "connection 50s") in order to have the MFP 100 operate as a server and the mobile terminal 200 operate as a client is not established regardless of whether or not the mobile terminal 200 has enabled P2P (C). Moreover, a "state where P2P (C) is enabled" can be restated as state where an SNEP connection in which the MFP 100 is to operate as a client can be established and a "state where P2P (C) is disabled" can be restated as state where an SNEP connection in which the MFP 100 is to operate as a client cannot be established. In a similar manner, a "state where P2P (S) is enabled" can be restated as state where an SNEP connection in which the MFP 100 is to operate as a server can be established and a "state where P2P (S) is disabled" can be restated as state where an SNEP connection in which the MFP 100 is to operate as a server cannot be established.

An NFC apparatus that operates as a client (hereinafter, simply referred to as a "client") can use an SNEP connection to transmit a request command to an NFC apparatus that operates as a server (hereinafter, simply referred to as a "server"). For example, a client transmits a PUT request and information to a server. Accordingly, the server can receive the information from the client and use the information. In addition, for example, a client can transmit a GET request to a server. In this case, the server transmits information in accordance with the GET request to the client. Accordingly, the client can receive the information from the server and use the information. Moreover, a server cannot transmit a PUT request nor a GET request to the client. In this manner, a client performs handling of communication of information and a server performs communication of information in accordance with a request from the client. In the present embodiment, a server and a client only use PUT requests instead of using GET requests. This is because, in a case where a GET request is used, since desired information must be sent back in accordance with the request, the number of communications increases as compared to a case of using a PUT request.

(Configuration of Mobile Terminal 200)

The mobile terminal 200 is, for example, a portable terminal such as a mobile phone (for example, a smart phone), a PDA, a notebook PC, a tablet PC, a portable music playback device, and a portable moving image playback device. The mobile terminal 200 includes an operation unit 212, a display unit 214, a Wi-Fi I/F 224, an NFC I/F 226, and a controller 230. The respective units 212 to 226 are similar to the respective units 112, 114, 124, and 126.

The controller 230 includes a CPU 232 and a memory 234. The CPU 232 executes various processes in accordance with an OS (short for operating system) program 236 stored in the memory 234. The memory 234 comprises a ROM, a RAM, a hard disk, or the like. The present embodiment assumes that the OS program 236 is one of a first type of OS program and a second type of OS program. The first type of OS program is, for example, Android (registered trademark) (for example, version 4.0). The second type of OS program is, for example, Windows Phone (registered trademark) (for example, version 8.1). In addition, the memory 234 may store an MFP application 238. The MFP application 238 is an application for causing the MFP 100 to perform various functions (for example, a print function, a scan function, and a FAX function) and is installed to the mobile terminal 200 from an Internet server (not illustrated) provided by a vendor of the MFP 100.

Both the first and second types of OS program cause the mobile terminal 200 to operate as follows. Specifically, while power of the mobile terminal 200 is turned ON, the mobile terminal 200 maintains a state where P2P (S) is enabled. The mobile terminal 200 disables the P2P (C) in a case where the MFP application 238 is not installed or in a case where the MFP application 238 is installed but not activated. The mobile terminal 200 enables the P2P (C) when the MFP application 238 is activated.

(Comparative embodiments X and Y: FIG. 2)

Next, before describing processes realized by the MFP 100 according to the present embodiment, comparative embodiments X and Y will be described with reference to FIG. 2. A feature of the comparative embodiments X and Y is that an MFP 10 according to the comparative embodiments acquires request information from the mobile terminal 200 by NFC communication. Moreover, hereinafter, a state where P2P (C) or P2P (S) is enabled will be expressed as "ON" and a state where P2P (C) or P2P (S) is disabled will be expressed as "OFF".

(Comparative embodiment X)

In the comparative embodiment X, the mobile terminal 200 comprises a first type of OS program 236. The P2P (S) of the mobile terminal 200 has been turned ON. In T10, a user turns ON the power of the MFP 10. Accordingly, in T12, the MFP 10 turns both P2P (C) and P2P (S) ON.

In T14, the user performs an activation operation for activating the MFP application 238 on the mobile terminal 200. Accordingly, in T16, the mobile terminal 200 turns ON P2P (C). In T18, the user brings the mobile terminal 200 close to the MFP 10 in a state where an image that is a print target is being displayed on the mobile terminal 200. As a result, in 120, an LLCP connection is established between the MFP 10 and the mobile terminal 200. At this point, both P2P (C) and P2P (S) are turned ON at each of the MFP 10 and the mobile terminal 200. Therefore, in T22 and T24, both the connection 50c and the connection 50s are established between the MFP 10 and the mobile terminal 200.

In T26, the mobile terminal 200 displays a tap screen for prompting the user to perform a tap operation (in other words, an operation of bringing a finger into contact with the display unit 214 for a short period of time). Moreover, a tap screen is a screen to be displayed by the mobile terminal 200 based on the first type of OS program 236 detecting that an LLCP connection has been established.

In T28, the user performs a tap operation on the mobile terminal 200. In T30, in response to the tap operation by the user, the mobile terminal 200 supplies a PUT request and request information to the MFP 10 using the connection 50s (in other words, by operating as a client). Request information refers to a command for requesting the MFP 10 to supply network information.

When the MFP 10 uses the connection 50s (in other words, operates as a server) to acquire a PUT request and request information from the mobile terminal 200, in T32, the MFP 10 uses the connection 50c (in other words, operates as a client) to supply the PUT request and network information to the mobile terminal 200. Network information refers to information related to a network to which the MFP 10 belongs. Moreover, since network information is supplied to the mobile terminal 200 not only in the comparative embodiments X and Y but also in the present embodiment, a detailed description of network information will be provided later.

Although not illustrated, when the mobile terminal 200 uses the connection 50c (in other words, operates as a server) to acquire a PUT request and network information from the MFP 10, the mobile terminal 200 uses the network information to supply print data representing an image that is the print target to the MFP 10 via any of a WFD network and an AP network. Since this applies not only to the comparative embodiments X and Y but also to the present embodiment, a detailed description thereof will be provided later.

(Comparative embodiment Y)

The comparative embodiment Y differs from the comparative embodiment X in that the mobile terminal 200 comprises a second type of OS program 236. T110 to T116 are respectively similar to T10 to T16 according to the comparative embodiment X.

In T117, the user performs a request supply operation for supplying request information to the MFP 10 on the mobile terminal 200. In other words, while an operation (T28) for supplying request information to the MFP 10 is performed on the mobile terminal 200 after the mobile terminal 200 is brought close to the MFP 10 in the comparative embodiment X, in the comparative embodiment Y, an operation (T117) is performed on the mobile terminal 200 before bringing the mobile terminal 200 close to the MFP 10. T118 to T132 are respectively similar to T18 to T24, T30, and T32.

In the respective comparative embodiments X and Y, the MFP 10 needs to acquire request information from the mobile terminal 200 before supplying network information to the mobile terminal 200. Therefore, the user is forced to perform an operation for causing the mobile terminal 200 to supply request information to the MFP 10 (in other words, the tap operation of T28 according to the comparative embodiment X or the request supply operation of T117 according to the comparative embodiment Y), which may cause the user to feel inconvenienced. In the present embodiment, the following processes are performed in order to improve user convenience.

Figure 3:
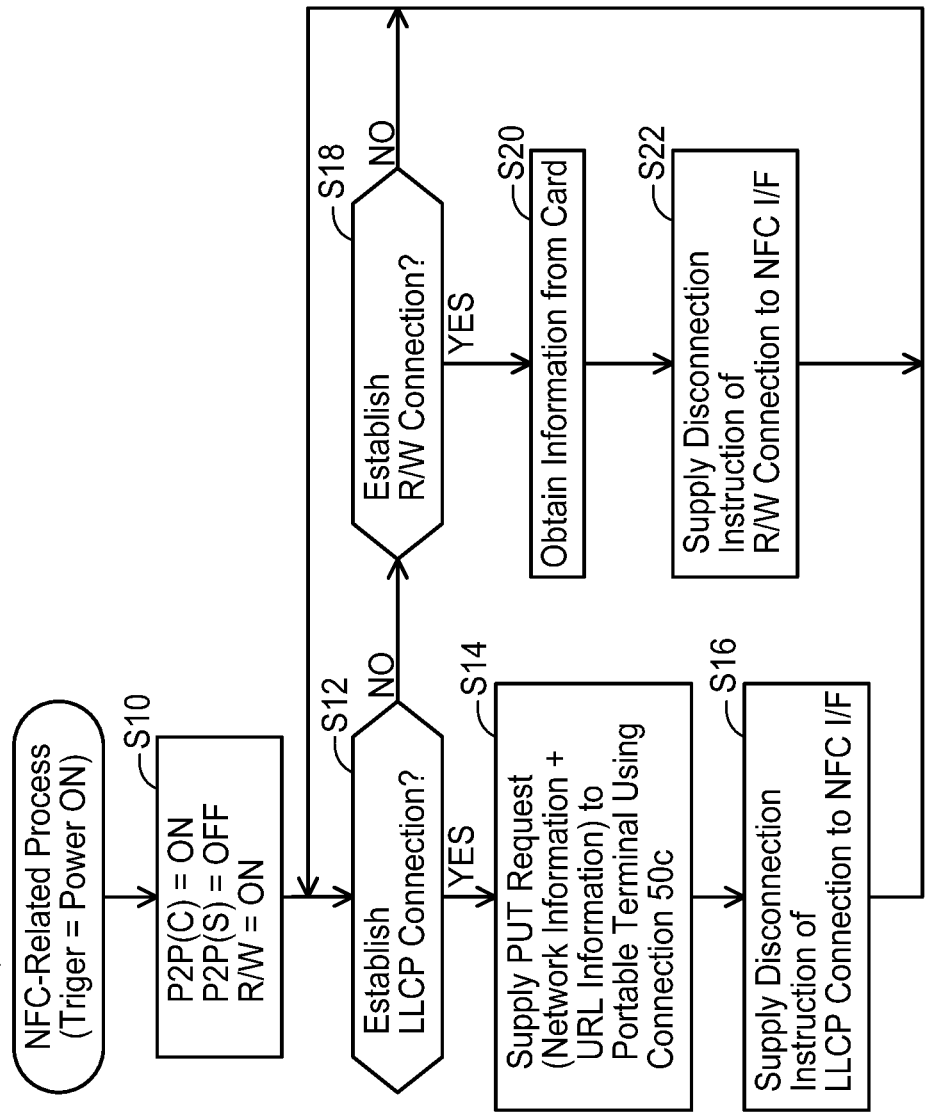
FIG. 3 shows a flow chart of an NFC-related process according to a first embodiment.

(NFC-Related Process of MFP 100: FIG. 3)

Next, contents of an NFC-related process that is performed by the CPU 132 in accordance with the program 136 will be described with reference to FIG. 3. Performance of the process shown in FIG. 3 by the CPU 132 is triggered by turning ON power of the MFP 100.

In S10, the CPU 132 supplies a setting instruction to the NFC I/F 126 to set the state of the NFC I/F 126 to a state where P2P (C) is enabled, P2P (S) is disabled, and R/W is enabled (in other words, P2P (C)=ON, P2P (S)=OFF, R/W=ON). A difference from the respective comparative embodiments X and Y shown in FIG. 2 is that P2P (S) is disabled.

In S12, the CPU 132 monitors that an LLCP connection is established between the MFP 100 and the mobile terminal 200. Specifically, the CPU 132 monitors that an LLCP notification indicating that an LLCP connection has been established is acquired from the NFC I/F 126. In a case where an LLCP notification is acquired from the NFC I/F 126 (YES in S12), the CPU 132 advances to S14. At this point, since at least P2P (S) is turned ON at the mobile terminal 200, the NFC I/F 126 establishes the connection 50c. However, since P2P (S) has been disabled at the MFP 100 (refer to S10), the NFC I/F 126 does not establish the connection 50s.

In S14, the CPU 132 uses the connection 50c (in other words, operates as a client) to supply a PUT request, network information, and URL (an abbreviation for uniform resource locator) information to the mobile terminal 200 via the NFC I/F 126. Specifically, the CPU 132 supplies network information and URL information to the NFC I/F 126 after the connection 50c is established. In a case of acquiring various types of information from the CPU 132, the NFC I/F 126 sends a PUT request and various types of information to the mobile terminal 200. Network information refers to information related to a network to which the MFP 100 belongs and includes at least WFD information 140a. In addition, network information includes AP information 140b in a case where the AP information 140b is stored in the AP storing area 134b and includes wired information 140c in a case where the wired information 140c is stored in the wired storing area 134c. Furthermore, URL information refers to information indicating an URL for installing the MFP application 238 from an Internet server.

Immediately after supplying the PUT request and various types of information to the mobile terminal 200, in S16, the CPU 132 supplies a disconnection instruction for disconnecting the LLCP connection to the NFC I/F 126. Upon acquiring the disconnection instruction from the CPU 132, the NFC I/F 126 performs communication of a command for disconnecting the LLCP connection with the mobile terminal 200 and disconnects the LLCP connection. As a result, the connection 50c is also disconnected. In this manner, since the connection with the mobile terminal 200 is disconnected immediately after the PUT request and the various types of information are supplied to the mobile terminal 200, acquisition of any information from the mobile terminal 200 can be suppressed. As a result, the MFP 100 need not perform a process in accordance with the information and can perform other processes in a speedy manner. For example, as will be described later, the MFP 100 can acquire print data from the mobile terminal 200 and appropriately perform a print process. Once S16 is completed, a return is made to S12.

In S18, the CPU 132 monitors that an R/W connection for operating as a Reader or a Writer is established. Specifically, the CPU 132 monitors that an R/W notification indicating that an R/W connection has been established is acquired from the NFC I/F 126. In a case where the R/W notification is acquired from the NFC I/F 126 (YES in S18), the CPU 132 advances to S20. Moreover, the present embodiment assumes that the R/W connection is established by a card conforming to the NFC standard being brought close to the NFC I/F 126.

In S20, the CPU 132 uses the R/W connection (specifically, operates as a Reader) to acquire information from the card via the NFC I/F 126. The information includes, for example, authentication information for specifying a holder of the card. In addition, although not illustrated, in a case where print data associated with the authentication information exists in the memory 134, the CPU 132 performs a print process in accordance with the print data.

In S22, the CPU 132 supplies a disconnection instruction for disconnecting the R/W connection to the NFC I/F 126. Upon acquiring the disconnection instruction from the CPU 132, the NFC I/F 126 performs communication of a command for disconnecting the R/W connection with the card and disconnects the R/W connection. Once S22 is completed, a return is made to S12.

Figure 4:
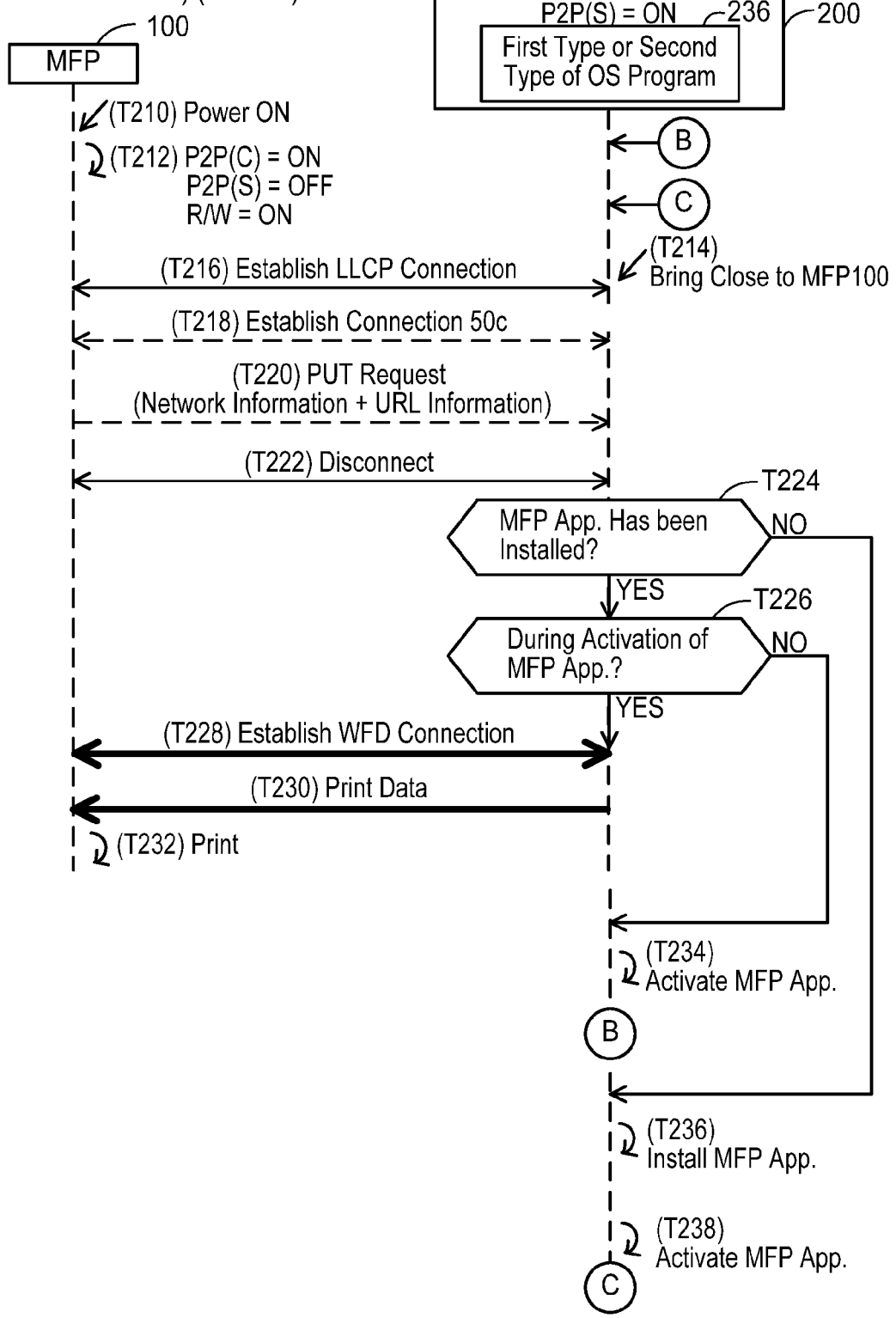
FIG. 4 shows a sequence diagram of case A.

(Case A: FIG. 4)

Next, a case A that is realized when the CPU 132 performs the process shown in FIG. 3 will be described. The mobile terminal 200 may comprise any OS program 236 among the first and second types of OS program. In an initial state shown in FIG. 4, P2P (S) of the mobile terminal 200 is turned ON. In T210, a user turns ON the power of the MFP 100 (the trigger of the process shown in FIG. 3). In T212, the MFP 100 turns ON P2P (C) and R/W (S) and turns OFF P2P (S) (S10).

In T214, the user brings the mobile terminal 200 close to the MFP 100 in a state where an image that is a print target is being displayed on the mobile terminal 200. As a result, in T216, an LLCP connection is established between the MFP 100 and the mobile terminal 200 (YES in S12). P2P (C) is turned ON at the MFP 100 and P2P (S) is turned ON at the mobile terminal 200. Accordingly, in T218, the connection 50c is established between the MFP 100 and the mobile terminal 200. Moreover, since P2P (S) is turned OFF at the MFP 100, the connection 50s is not established between the MFP 100 and the mobile terminal 200 regardless of whether P2P (C) of the mobile terminal 200 is turned ON or OFF.

In T220, the MFP 100 uses the connection 50c to supply a PUT request, network information, and URL information to the mobile terminal 200 (S14). In T222, the MFP 100 disconnects the LLCP connection and the connection 50c with the mobile terminal 200 (S16).

In T224, the mobile terminal 200 determines whether or not an MFP application 238 has been installed based on the acquired URL information. In a case where the MFP application 238 has been installed, the mobile terminal 200 makes a determination of YES in T224 and advances to T226. On the other hand, in a case where the MFP application 238 has not been installed, the mobile terminal 200 makes a determination of NO in T224 and advances to T236.

In T226, the mobile terminal 200 determines whether or not the MFP application 238 has been activated. When the MFP application 238 has been activated, the mobile terminal 200 makes a determination of YES in T226. In this case, the mobile terminal 200 uses network information to perform the following process. Specifically, in a case where the network information includes AP information 140b or, in other words, in a case where the MFP 100 belongs to a specific AP network, the mobile terminal 200 uses the AP information 140b to determine whether or not communication can be performed with the MFP 100 via an AP network to which the mobile terminal 200 itself belongs. More specifically, the mobile terminal 200 attempts to communicate with the MFP 100 using the BSSID, the IP address of the MFP 100, the subnet mask of the MFP 100, and the MAC address of the MFP 100 in the AP information 140b via the AP network to which the mobile terminal 200 itself belongs. Specifically, the mobile terminal 200 sends a confirmation signal to the MFP 100 and determines that communication can be performed with the MFP 100 in a case where a response signal to the confirmation signal is received from the MFP 100. In this case, the mobile terminal 200 supplies print data representing an image that is a print target to the MFP 100 via the AP network (not illustrated) using the IP address and the subnet mask of the MFP 100 in the AP information 140b.

In addition, in a case where the network information includes wired information 140c or, in other words, in a case where the MFP 100 belongs to a specific wired network, the mobile terminal 200 uses the wired information 140c to determine whether or not communication can be performed with the MFP 100 via an AP network to which the mobile terminal 200 itself belongs. Specifically, the mobile terminal 200 attempts to communicate with the MFP 100 using the IP address, the subnet mask, and the MAC address of the MFP 100 in the wired information 140c via the AP network to which the mobile terminal 200 itself belongs and a wired network connected to the AP network. More specifically, the mobile terminal 200 transmits a confirmation signal to the MFP 100 and determines that communication can be performed with the MFP 100 when a response signal to the confirmation signal is received from the MFP 100. In this case, the mobile terminal 200 supplies print data to the MFP 100 via the AP network (not illustrated) using the IP address and the subnet mask of the MFP 100 in the wired information 140c.

Furthermore, when print data cannot be supplied to the MFP 100 via an AP network, the mobile terminal 200 establishes a WFD connection in accordance with the WFD standard with the MFP 100 using the WFD information 140a in the network information. This situation is expressed in T228. In other words, in T228, the MFP 100 (in other words, the CPU 132) performs communication of various signals (a Probe Request signal, an Authentication Request signal, an Association Request signal, a 4-way handshake, and the like) with the mobile terminal 200 via the Wi-Fi I/F 124 using the WFD information 140a and establishes a WFD connection with the mobile terminal 200. Accordingly, a WFD network is formed in which the MFP 100 operates as a G/O apparatus and the mobile terminal 200 operates as a CL (short for client).

In T230, the mobile terminal 200 supplies print data to the MFP 100 using the WFD network.

When the MFP 100 acquires print data using the WFD network from the mobile terminal 200 via the Wi-Fi T/F 124, in T232, the MFP 100 performs printing of the image represented by the print data. Once T232 is completed, the sequence shown in FIG. 4 is ended.

On the other hand, in a case where the MFP application 238 has not been activated, the mobile terminal 200 makes a determination of NO in T226 and activates the MFP application 238 in T234. Once T234 is completed, a return is made to T214. In other words, in a case where the MFP application 238 has been installed to the mobile terminal 200 but is not activated (YES in T224, NO in T226), the operation of T214 for bringing the mobile terminal 200 close to the MFP 100 must be performed once again. Respective subsequent processes T216 to T232 are as described above.

In addition, in T236, the mobile terminal 200 accesses the URL indicated by the acquired URL information and installs the MFP application 238 from the server. Subsequently, in T238, the mobile terminal 200 activates the MFP application 238. Once T238 is completed, a return is made to T214. In other words, in a case where the MFP application 238 has not been installed to the mobile terminal 200 (NO in T224), the operation of T214 for bringing the mobile terminal 200 close to the MFP 100 must be performed once again. Respective subsequent processes T216 to T232 are as described above.

(Effect of the present embodiment)

In the comparative embodiments X and Y shown in FIG. 2, in response to acquiring request information from the mobile terminal 200 using the connection 50s, the MFP 10 supplies network information to the mobile terminal 200 using the connection 50c. In other words, the MFP 10 awaits acquisition of request information to supply network information to the mobile terminal 200. In this manner, since the MFP 10 awaits acquisition of request information before supplying network information, the tap operation of T28 according to the comparative embodiment X or the request supply operation of T117 according to the comparative embodiment Y must be performed at the mobile terminal 200. In contrast, as represented by the case A shown in FIG. 4, in the present embodiment, the connection 50s is not established since the MFP 100 maintains a state where P2P (S) is turned OFF. In addition, after establishing the connection 50c (T218), the MFP 100 can supply network information to the mobile terminal 200 using the connection 50c (T220) without having to acquire request information from the mobile terminal 200 using the connection 50s. In other words, the MFP 100 can supply network information to the mobile terminal 200 regardless of whether or not request information is acquired. Specifically, the MFP 100 can supply network information to the mobile terminal 200 without awaiting acquisition of request information. Furthermore, since the MFP 100 does not await acquisition of request information, the user need no longer perform a tap operation or a request supply operation on the mobile terminal 200. As a result, the convenience of the user is improved.

(Correspondence)

The MFP 100 is an example of a "communication apparatus" and the mobile terminal 200 is an example of an "external apparatus" respectively. The Wi-Fi I/F 124 is an example of a "first wireless interface" and the NFC I/F 126 is an example of a "second wireless interface" respectively. The connection 50*c* is an example of a "first type of wireless connection", the connection 50*s* is an example of a "second type of wireless connection", and the WFD connection is an example of a "particular wireless connection" respectively. SNEP is an example of a "particular protocol" and the WFD information 140*a* in network information is an example of "wireless information" respectively.

Figure 5:
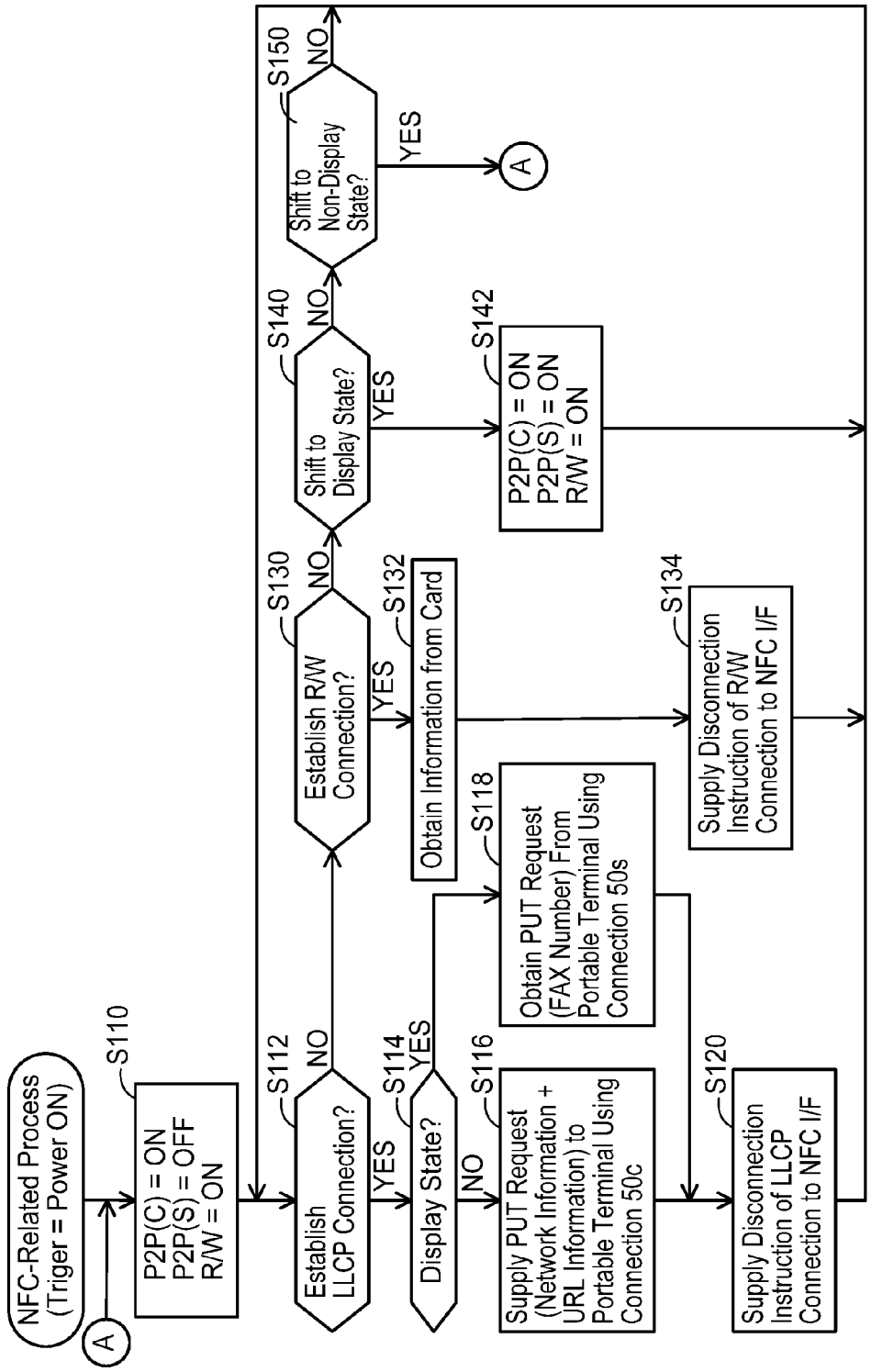
FIG. 5 shows a flow chart of an NFC-related process according to a second embodiment.

Second Embodiment: FIG. 5

Differences from the first embodiment will be mainly described. In the present embodiment, since the MFP 100 may turn ON P2P (S), the connection 50*s* may be established between the MFP 100 and the mobile terminal 200. The CPU 132 performs the process shown in FIG. 5 in place of the process shown in FIG. 3. S110 and S112 are respectively similar to S10 and S12 shown in FIG. 3.

In S114, the CPU 132 determines whether or not the state of the display unit 114 is a state where a FAX screen for performing a FAX process is being displayed (hereinafter, referred to as a "display state"). In a state where the MFP 100 awaits an instruction to perform some kind of process, a wait screen (in other words, a home screen) is displayed on the display unit 114. The wait screen includes a FAX button indicating FAX, a scan button indicating scan, and the like. In a case where the FAX button is selected on the wait screen, a FAX screen is displayed on the display unit 114 in place of the wait screen. In a case where the state of the display unit 114 is the display state, the CPU 132 makes a determination of YES in S114 and advances to S118. On the other hand, in a case where the state of the display unit 114 is not a state displaying the FAX screen (hereinafter, referred to as a "non-display state"), the CPU 132 makes a determination of NO in S114 and advances to S116. S116 is similar to S14 shown in FIG. 3.

In a case where advancing to S118, since P2P (S) has been enabled at the MFP 100 (refer to S140 and S142 to be described later), if the MFP application 238 has been activated (in other words, if P2P (C) has been enabled) at the mobile terminal 200, the NFC I/F 126 establishes the connection 50*s*. Subsequently, in S118, the CPU 132 uses the connection 50*s* to acquire a PUT request and a FAX number from the mobile terminal 200 via the NFC I/F 126. A FAX number represents a transmission destination of FAX data generated by the MFP 100. Accordingly, although not illustrated, the CPU 132 can send FAX data with the acquired FAX number as a sending destination. Once S118 is completed, the CPU 132 advances to S120. S120 to S134 are similar to S16 to S22.

In S140, the CPU 132 determines whether or not the state of the display unit 114 has made a transition from a non-display state to a display state. The CPU 132 makes a determination of YES in S140 in a case where the FAX button is selected by the user on the wait screen and advances to S142. In S142, the CPU 132 supplies a setting instruction to the NFC I/F 126 to set the state of the NFC I/F 126 to a state where P2P (S), P2P (C), and R/W are all enabled (in other words, P2P (S)=ON, P2P (C)=ON, R/W=ON). Since P2P (S) is enabled at this point, the connection 50*c* is established in S118. Once S142 is completed, a return is made to S112.

In S150, the CPU 132 determines whether or not the state of the display unit 114 has made a transition from a display state to a non-display state. For example, in a case where a cancel button included in the FAX screen is selected by the user or transmission of FAX data is completed after S118, the wait screen is displayed on the display unit 114 in place of the FAX screen. In this case, the CPU 132 makes a determination of YES in S150 and performs S110. Accordingly, P2P (S) is disabled.

(Specific Cases)

Next, cases that are realized when the CPU 132 performs the process shown in FIG. 5 will be described. In a case where the user of the mobile terminal 200 wishes to have the MFP 100 perform a print process, the user brings the mobile terminal 200 close to the MFP 100 while the display unit 114 is displaying the wait screen (in other words, a non-display state of the FAX screen). At this point, since P2P (S) is turned OFF at the MFP 100 (S110), the connection 50*c* but not the connection 50*s* is established between the MFP 100 and the mobile terminal 200 (S116). As a result, the MFP 100 can use the connection 50*c* to supply network information to the mobile terminal 200 (S116). In other words, respective processes similar to those of the case A shown in FIG. 4 according to the first embodiment are realized. Therefore, also in the present embodiment, similar effects to the first embodiment can be created.

Figure 6:
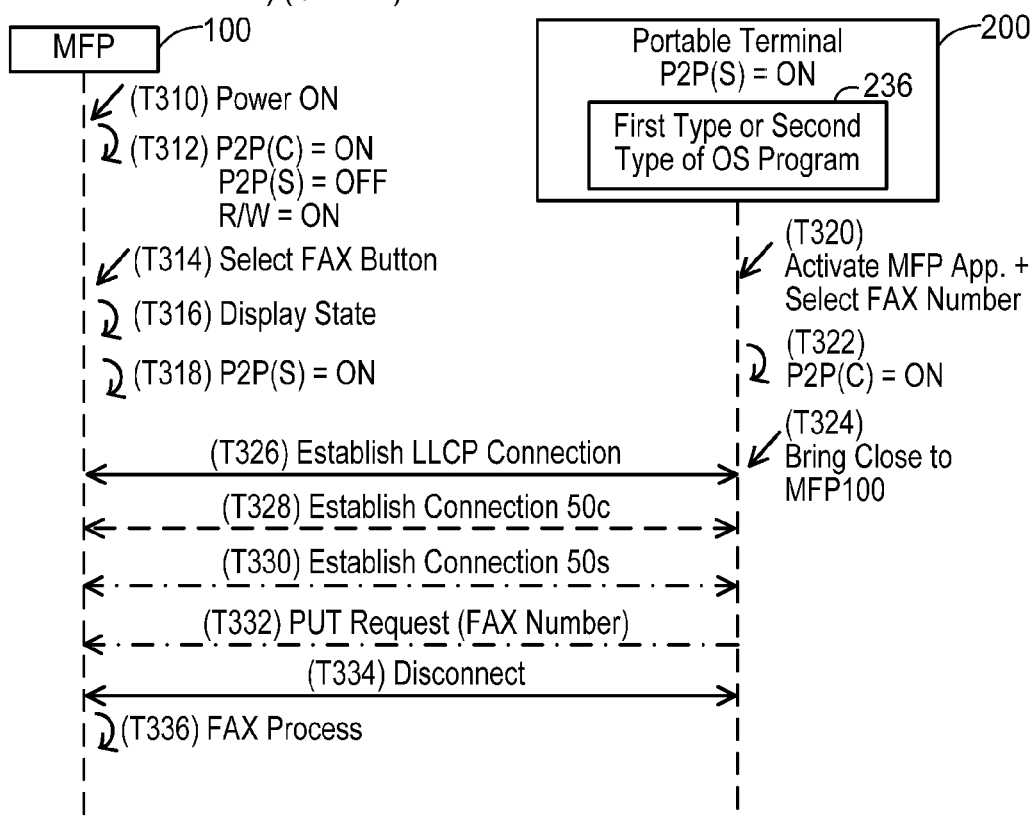
FIG. 6 shows a sequence diagram of case B.

(Case B: FIG. 6)

Meanwhile, in a case where the user of the mobile terminal 200 wishes to have the MFP 100 perform a FAX process, the user brings the mobile terminal 200 close to the MFP 100 while the display unit 114 is displaying the FAX screen (in other words, a display state of the FAX screen). In this case, a case B shown in FIG. 6 is realized. In the case B, the mobile terminal 200 may include any OS program 236 among the first and second types of OS program. T310 and T312 are respectively similar to T210 and T212 shown in FIG. 4.

In T314, the user selects the FAX button on the wait screen. In this case, the MFP 100 makes a transition from a non-display state to a display state in T316 (YES in S140) and, in T318, turns ON P2P (S) (S142).

In T320, the user performs an activation operation for activating the MFP application 238 on the mobile terminal 200 and further selects a desired FAX number from a phonebook in the mobile terminal 200. Since the MFP application 238 is activated, in T322, the mobile terminal 200 turns ON P2P (C). T324 to T328 are similar to T214 to T218 shown in FIG. 4.

Since P2P (S) is turned ON at the MFP 100 (T318) and P2P (C) is turned ON at the mobile terminal 200 (T322), in T330, the connection 50*s* is established between the MFP 100 and the mobile terminal 200. In other words, both the connection 50*c* and the connection 50*s* are established between the MFP 100 and the mobile terminal 200. In addition, since the MFP 100 is in the display state (YES in S114), in T332, the MFP 100 uses the connection 50*s* to acquire a PUT request and the FAX number selected in T320 from the mobile terminal 200 (S118). Subsequently, in T334, the MFP 100 disconnects the LLCP connection, the connection 50c, and the connection 50s with the mobile terminal 200 (S120). In addition, in T336, the MFP 100 transmits FAX data with the acquired FAX number as a transmission destination. In this manner, the MFP 100 can transmit FAX data using the FAX number acquired from the mobile terminal 200. In particular, in the present embodiment, P2P (S) is enabled or disabled at the MFP 100 (S110 or S142 in FIG. 5) in accordance with a state of the display unit 114. As a result, the MFP 100 can be appropriately switched between supplying network information to the mobile terminal 200 and acquiring a FAX number from the mobile terminal 200 in accordance with the state of the display unit 114. Therefore, the MFP 100 can appropriately perform processes in accordance with the intention of the user of the mobile terminal 200. In the present embodiment, the display unit 114 being in a display state is an example of "satisfies a predetermined condition". The FAX number is an example of "target information".

Figure 7:
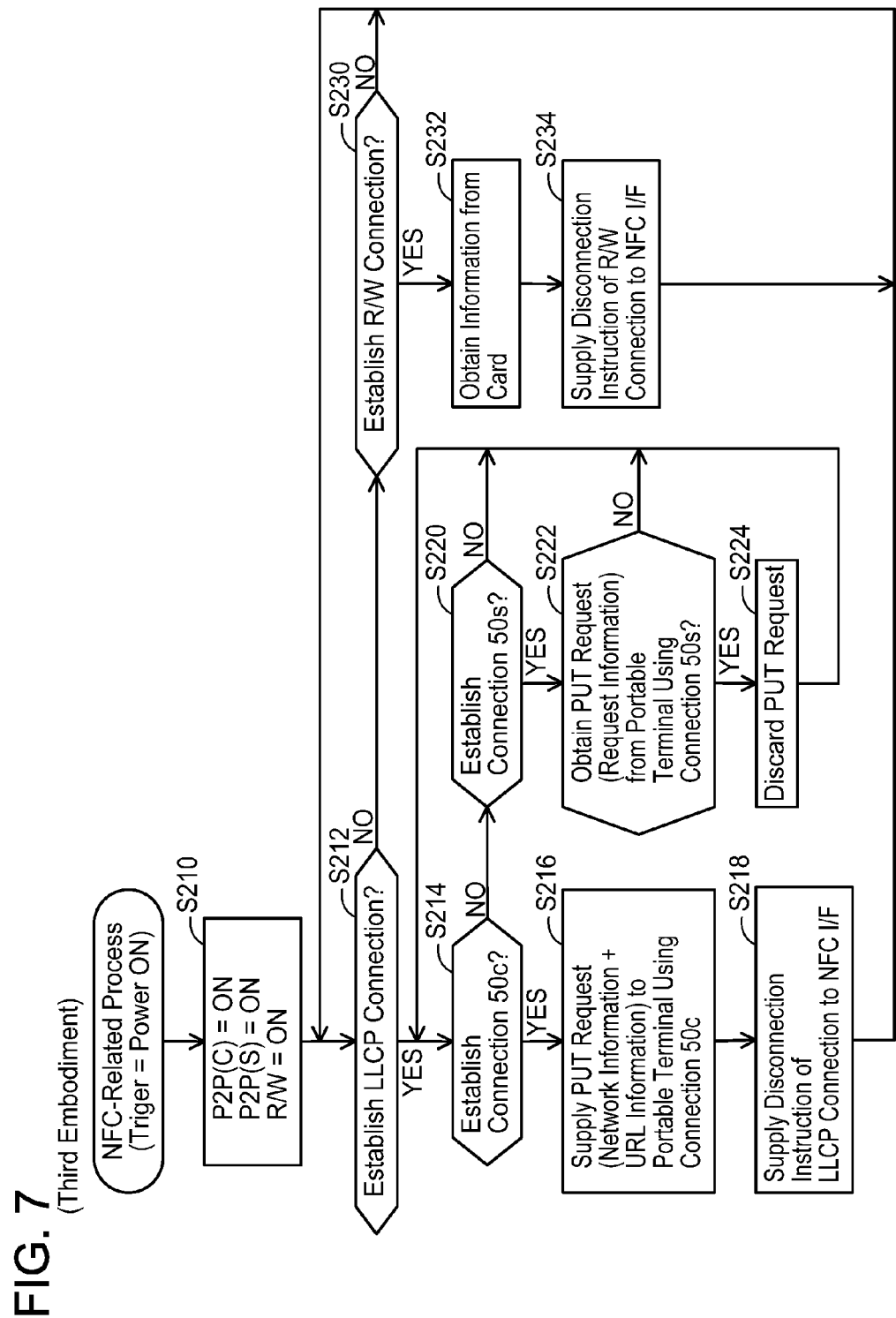
FIG. 7 shows a flow chart of an NFC-related process according to a third embodiment.

Third Embodiment: FIG. 7

Differences from the first embodiment will be mainly described. In the present embodiment, since the MFP 100 maintains a state where both P2P (S) and P2P (C) are turned ON, both the connection 50c and the connection 50s are established between the MFP 100 and the mobile terminal 200.

The CPU 132 performs the process shown in FIG. 7 in place of the process shown in FIG. 3. In S210, the CPU 132 supplies a setting instruction to the NFC I/F 126 to set the state of the NFC I/F 126 to a state where P2P (S), P2P (C), and R/W are all enabled (in other words, P2P (S)=ON, P2P (C)=ON, R/W=ON). Enabling both P2P (C) and P2P (S) in the MFP 100 has the following effect. Specifically, there is a possibility that the OS program 236 mounted to the mobile terminal 200 cannot stably perform NFC communication using a SNEP connection in a state where only one of the connections 50c and 50s is established. In the present embodiment, both P2P (C) and P2P (S) are always enabled at the MFP 100. Accordingly, since both connections 50c and 50s are always established, an occurrence of a phenomenon in which the mobile terminal 200 cannot stably perform NFC communication using a SNEP connection can be suppressed.

S212 is similar to S12 shown in FIG. 3. In S214, the CPU 132 monitors that the connection 50c is established. Specifically, the CPU 132 monitors that a client notification indicating that the connection 50c has been established is acquired from the NFC I/F 126. In a case where a client notification is acquired from the NFC I/F 126, the CPU 132 makes a determination of YES in S214 and advances to S216, S216 and S218 are respectively similar to S14 and S16 shown in FIG. 3. Once S218 is completed, a return is made to S212.

In S220, the CPU 132 monitors that the connection 50s is established. Specifically, the CPU 132 monitors that a server notification indicating that the connection 50s has been established is acquired from the NFC I/F 126. In a case where a server notification is acquired from the NFC I/F 126, the CPU 132 makes a determination of YES in S220 and, in S222, the CPU 132 uses the connection 50s to determine whether or not a PUT request and request information have been acquired from the mobile terminal 200 via the NFC I/F 126. The mobile terminal 200 includes the second type of OS program 236 and, in a case where the request supply operation (T117 in FIG. 2) is performed before an LLCP connection with the MFP 100 is established, supplies a PUT request and request information to the MFP 100. Moreover, request information refers to a command for requesting the MFP 100 to supply network information.

In a case where a PUT request and request information are received from the mobile terminal 200 using the connection 50s, the NFC I/F 126 supplies the request information to the CPU 132. In a case where request information is acquired from the NFC I/F 126, the CPU 132 makes a determination of YES in S222 and advances to S224. On the other hand, in a case where request information is not acquired from the NFC I/F 126, the CPU 132 returns to S214.

In S224, the CPU 132 discards the request information acquired in S222. In other words, even when request information is acquired in S222, the CPU 132 does not perform processes in accordance with the request information (specifically, a determination process using AP information, a process of supplying network information, and the like). Accordingly, processing load on the CPU 132 can be reduced. S230 to S234 are similar to S18 to S22 shown in FIG. 3.

Figure 8:
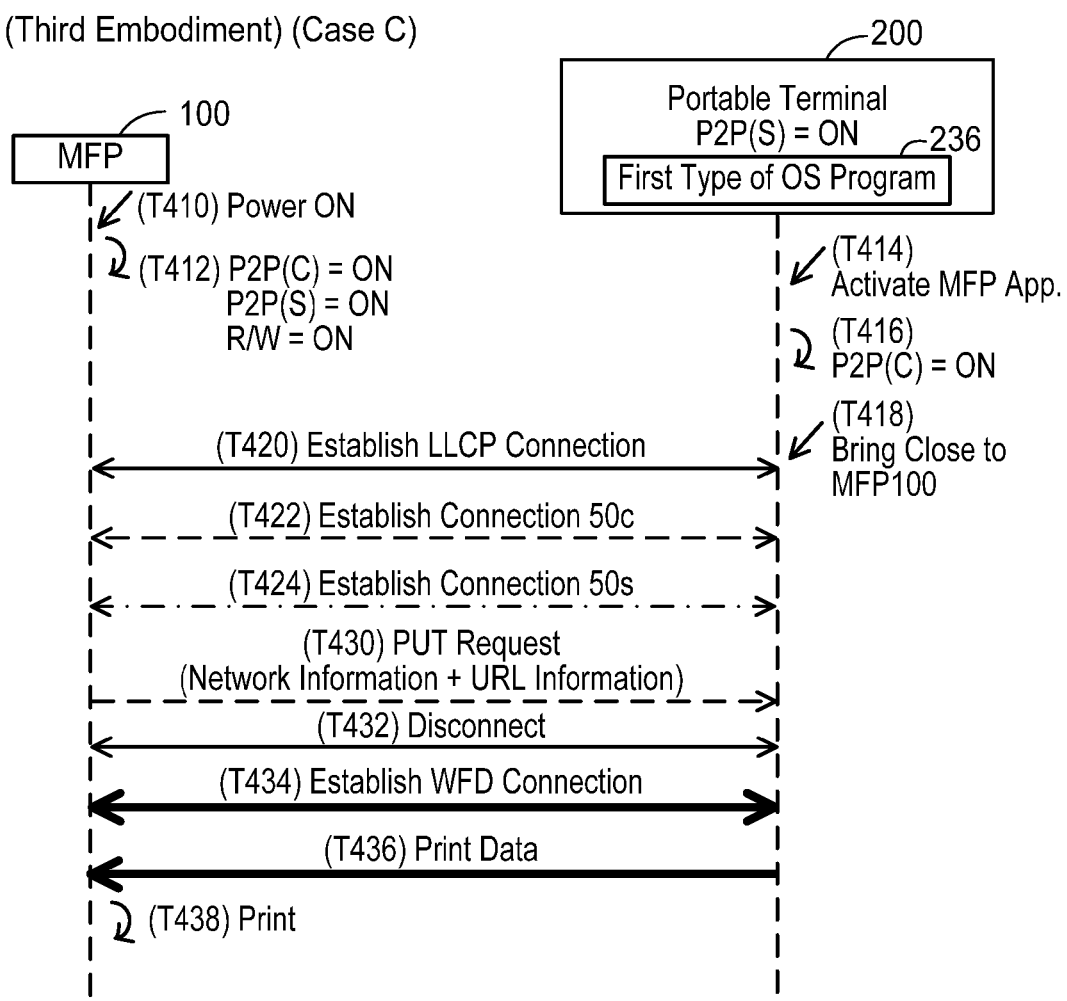
FIG. 8 shows a sequence diagram of case C.

(Case C: FIG. 8)

Next, a specific case that is realized when the CPU 132 performs the process shown in FIG. 7 will be described. In a case C, the mobile terminal 200 comprises a first type of OS program 236. T410 is similar to T210 shown in FIG. 4.

In T412, the MFP 100 turns ON P2P (C), P2P (S), and R/W (S) (S210 in FIG. 7). T414 to T424 are similar to T320 to T330 shown in FIG. 6. T430 to T438 are similar to T220, 1222, and 1228 to T232 shown in FIG. 4. Moreover, the first type of OS program 236 displays a tap screen in accordance with an LLCP connection being established with the MFP 100. In addition, the mobile terminal 200 uses the connection 50s to supply request information to the MFP 100 (refer to the comparative embodiment X shown in FIG. 2) in accordance with a tap operation being performed. However, in the present embodiment, the MFP 100 can use the connection 50c to supply network information to the mobile terminal 200 without awaiting acquisition of request information (YES in S214 shown in FIG. 7, S216). As a result, the MFP 100 uses the connection 50c to supply network information to the mobile terminal 200 before a tap operation is performed on the mobile terminal 200. Therefore, the MFP 100 does not acquire request information from the mobile terminal 200 (in other words, S222 is not performed). In other words, the MFP 100 can supply network information to the mobile terminal 200 regardless of whether or not request information is acquired.

Figure 9:
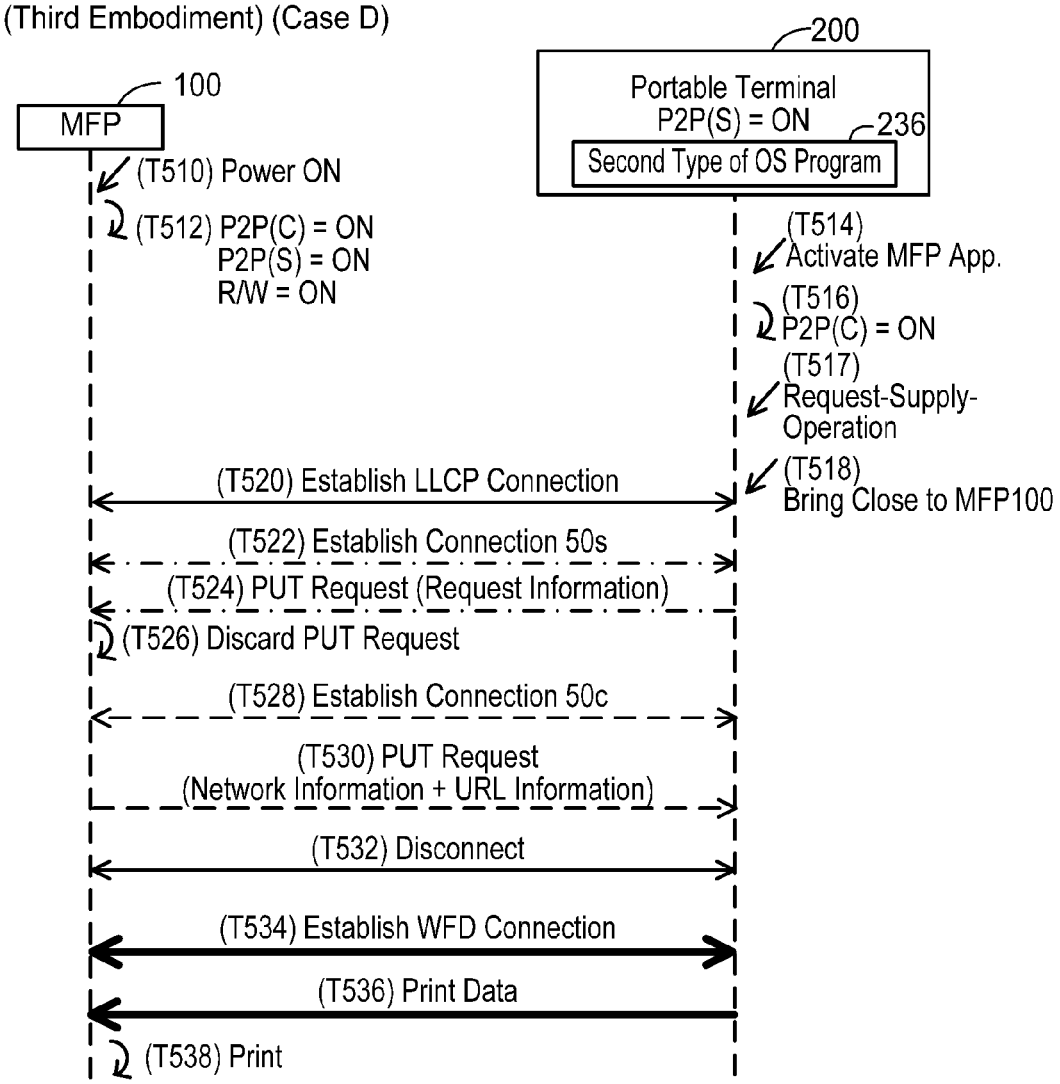
FIG. 9 shows a sequence diagram of case D.

(Case D: FIG. 9)

In a case D, the mobile terminal 200 includes a second type of OS program 236. T510 to T516 are similar to T410 to T416 shown in FIG. 8. In T517, the user performs a request supply operation on the mobile terminal 200. T518 and T520 are similar to T418 and T420 shown in FIG. 8.

In T522, the connection 50s is established (YES in S220). In addition, in T524, the mobile terminal 200 uses the connection 50s to supply a PUT request and request information to the MFP 100. The MFP 100 acquires the PUT request and the request information from the mobile terminal 200 using the connection 50s (YES in S222) and, in T526, the MFP 100 discards the request information and does not perform processes in accordance with the request information (S224). T528 to T538 are similar to T218 to T222 and T228 to T232 shown in FIG. 4.

According to the case D, since the MPP 100 establishes the connection 50s (T522) before the connection 50c is established, the MFP 100 acquires request information from the mobile terminal 200 using the connection 50*s* (T524). The MFP 100 discards the request information without performing processes in accordance with the request information (T526). Accordingly, processing load on the MFP 100 can be reduced. In the present embodiment, the request information is an example of "particular information". Moreover, which of the connections 50*c* and 50*s* is to be established first is not determined in advance. Therefore, in a case where the connection 50*c* is established first unlike in the case D, the MFP 100 may supply network information to the mobile terminal 200 using the connection 50*c* without having to acquire request information from the mobile terminal 200 using the connection 50*s*. As a result, the MFP 100 can supply network information to the mobile terminal 200 regardless of whether or not request information is acquired.

First Modification

In the respective embodiments described above, the CPU 132 supplies a PUT request and various types of information to the NFC I/F 126 after the connection 50*c* is established (S14 shown in FIG. 3 and the like). In a modification, the CPU 132 may supply the various types of information to the NFC I/F 126 in advance before the connection 50*c* is established. A memory (not illustrated) of the NFC I/F 126 may store the various types of information, and a CPU (not illustrated) of the NFC I/F 126 may transmit to the mobile terminal the various types of information after the connection 50*c* is established even when no instruction is acquired from the CPU 132. In other words, "supply wireless information to the external apparatus" may be realized by the CPU of the NFC I/F 126.

In a similar manner to the modification described above, a memory (not illustrated) of the Wi-Fi I/F 124 may store the WFD information 140*a* in advance. In addition, a CPU (not illustrated) of the Wi-Fi I/F 124 may establish a WFD connection using the WFD information 140*a* after the connection 50*c* is established even when no instruction is acquired from the CPU 132. In other words, "establish the particular wireless connection with the external apparatus" may be realized by the Wi-Fi I/F 124.

Second Modification

While the CPU 132 discards the PUT request and the request information acquired in S222 in S224 in the third embodiment described above, the CPU 132 may perform the following process instead. Specifically, in a case where a PUT request and request information are acquired in S222, the CPU 132 may perform a process in accordance with the AP information in the request information. In other words, a "communication apparatus" may perform a process in accordance with particular information.

Third Modification

In the third embodiment described above, in a case where a PUT request and request information are received using the connection 50*s*, the NFC I/F 126 supplies the PUT request and the request information to the CPU 132 (refer to S222 shown in FIG. 7). In a modification, a CPU (not illustrated) of the NFC I/F 126 may discard the PUT request and the request information without supplying the PUT request and the request information to the CPU 132. In other words, a "second wireless interface" may not supply particular information to the controller.

Fourth Modification

In the second embodiment described above, a display state of a scan screen for performing a scan process may be adopted instead of a display state of a FAX screen. In addition, in S118, the CPU 132 may acquire a URL of a server that is an upload destination of scan data from the mobile terminal 200 instead of a FAX number. In this case, the CPU 132 can generate the scan data by having the scan performing unit 118 perform a scan process and can upload the scan data to the server using the acquired URL.

In another modification, a display state of an input screen for inputting some kind of character string may be adopted instead of a display state of a FAX screen. In S118, the CPU 132 may acquire a character string from the mobile terminal 200 instead of a FAX number. In this case, the CPU 132 can perform a process using the character string. Normally, since the operation unit 212 of the mobile terminal 200 has higher operability than the operation unit 112 of the MFP 100, the mobile terminal 200 enables a character string to be more readily input than the MFP 100. Therefore, by inputting a character string to the mobile terminal 200 and bringing the mobile terminal 200 close to the MFP 100, the user can readily input a character string to the MFP 100. In other words, for example, "satisfies a predetermined condition" may correspond to being in a display state of a scan screen or being in a display state of an input screen. In addition, for example, "target information" may be a URL of a server that is an upload destination of scan data or a character string to be input to the MFP 100.

Fifth Modification

A "communication apparatus" is not limited to a multi-function peripheral capable of performing a print function and a scan function (in other words, the MFP 100) and may be a printer capable of performing only a print function among a print function and a scan function or a scanner capable of performing only a scan function among a print function and a scan function. In addition, a "communication apparatus" may be an apparatus (for example, a PC, a server, and a mobile terminal (a mobile phone, a smart phone, a PDA, and the like)) which performs a function that differs from a print function and a scan function (for example, an image display function or a data processing function). In other words, a "communication apparatus" includes all devices capable of establishing a first type of wireless connection and a particular wireless connection. In a similar manner, a "communication apparatus" includes all devices capable of establishing a second type of wireless connection and a particular wireless connection.

Sixth Modification

In the third embodiment described above, in S222 shown in FIG. 7, the CPU 132 may determine whether or not AP information has been acquired from the mobile terminal 200 instead of request information. The AP information is information (for example, an SSID and a password) used by an AP network in a case where the mobile terminal 200 currently belongs to the AP network. The AP information is supplied on the assumption that the AP information is to be acquired by an MFP that differs from the MFP 100. In a case of acquiring AP information from the mobile terminal 200, the different MFP establishes a wireless connection with an AP using the AP information and belongs to the same AP network as the mobile terminal 200. In this case, the mobile terminal 200 supplies print data to the MFP 100 using the AP network. In other words, "particular information" may be AP information.

Seventh Modification

In the case C shown in FIG. 8, T418 and thereafter may be performed instead of performing T414 and T416. In this case, processes of T224, T226, and T234 to T238 shown in FIG. 4 may be performed after T432. In addition, a return may be made to T416 after T234 or T238. Similarly, in the case D shown in FIG. 9, T518 and thereafter may be performed instead of performing T514 to T517. The processes of T224, T226, and T234 to T238 shown in FIG. 4 may be performed after T532.

Eighth Modification

The respective processes shown in FIGS. 3, 5, and 7 are realized by software (in other words, the program 136) in the respective embodiments described above. Alternatively, at least one of the processes shown in FIGS. 3, 5, and 7 may be realized by hardware such as a logic circuit.

What is claimed is:

1. A communication apparatus comprising:
a first wireless interface;
a second wireless interface being different from the first wireless interface and configured to:
   establish a first type of wireless connection with an external apparatus, the first type of wireless connection being a connection where the communication apparatus operates as a client in accordance with a particular protocol and the external apparatus operates as a server in accordance with the particular protocol; and
   after the first type of wireless connection with the external apparatus is established, supply wireless information to the external apparatus using the first type of wireless connection, regardless of whether request information for requesting supply of the wireless information is obtained from the external apparatus, the wireless information being for establishing a particular wireless connection via the first wireless interface; and
a controller configured to establish the particular wireless connection with the external apparatus via the first wireless interface using the wireless information after the wireless information is supplied to the external apparatus.

2. The communication apparatus as in claim 1, wherein the controller is further configured to set a state of the second wireless interface in a dual state in which both a client function and a server function in accordance with the particular protocol are enabled,
the second wireless interface is configured to establish both the first type of wireless connection with the external apparatus and a second type of wireless connection with the external apparatus in a case of being set in the dual state, and
the second type of wireless connection is a connection where the communication apparatus operates as a server in accordance with the particular protocol and the external apparatus operates as a client in accordance with the particular protocol.

3. The communication apparatus as in claim 2, wherein even if the second wireless interface receives particular information from the external apparatus using the second type of wireless connection, a process in response to the particular information is not executed.

4. The communication apparatus as in claim 3, wherein the second wireless interface supplies the particular information to the controller in a case of receiving the particular information from the external apparatus using the second type of wireless connection,
the controller is further configured to discard the particular information without executing the process in response to the particular information even if the controller obtains the particular information from the second wireless interface.

5. The communication apparatus as in claim 3, wherein the particular information includes the request information.

6. The communication apparatus as in claim 2, wherein the state of the second wireless interface is set in the dual state when power of the communication apparatus is turned ON.

7. The communication apparatus as in claim 1, wherein the controller is further configured to set a state of the second wireless interface in a single state in which a client function in accordance with the particular protocol is enabled and a server function in accordance with the particular protocol is disabled,
the second wireless interface is configured to establish the first type of wireless connection with the external apparatus and not establish a second type of wireless connection with the external apparatus in a case of being set in the single state, and
the second type of wireless connection is a connection where the communication apparatus operates as a server in accordance with the particular protocol and the external apparatus operates as a client in accordance with the particular protocol.

8. The communication apparatus as in claim 7, wherein the controller is further configured to set the state of the second wireless interface in a dual state in which both the client function and the server function in accordance with the particular protocol are enabled in a case where the communication apparatus satisfies a predetermined condition,
the second wireless interface is configured to establish both the first type of wireless connection with the external apparatus and the second type of wireless connection with the external apparatus in a case of being set in the dual state,
the state of the second wireless interface is set in the single state in a case where the communication apparatus does not satisfy the predetermined condition, and
the controller is further configured to:
   obtain target information from the external apparatus via the second wireless interface using the second type of wireless connection with the external apparatus; and
   execute a process in response to the target information.

9. The communication apparatus as in claim 7, wherein the state of the second wireless interface is set in the single state when power of the communication apparatus is turned ON.

10. The communication apparatus as in claim 1, wherein the controller is further configured to disconnect the first type of wireless connection immediately after the wireless information is supplied to the external apparatus.

11. A non-transitory computer-readable storage medium storing computer-readable instructions for a communication apparatus, wherein
the communication apparatus comprises:
a first wireless interface; and
a second wireless interface being different from the first wireless interface and configured to establish a first type of wireless connection with an external apparatus, the first type of wireless connection being a connection where the communication apparatus operates as a client in accordance with a particular protocol and the external apparatus operates as a server in accordance with the particular protocol; and
wherein the computer-readable instructions, when executed by a processor, cause the communication apparatus to perform:
after the first type of wireless connection with the external apparatus is established, supplying wireless information to the external apparatus via the second wireless interface using the first type of wireless connection, regardless of whether request information for requesting supply of the wireless information is obtained from the external apparatus, the wireless information being information for establishing a particular wireless connection via the first wireless interface; and
establishing the particular wireless connection with the external apparatus via the first wireless interface using the wireless information after the wireless information is supplied to the external apparatus.

12. A method performed by a communication apparatus, the communication apparatus comprising:
a first wireless interface; and
a second wireless interface being different from the first wireless interface,
the method comprising:
establishing a first type of wireless connection with an external apparatus via the second wireless interface, the first type of wireless connection being a connection where the communication apparatus operates as a client in accordance with a particular protocol and the external apparatus operates as a server in accordance with the particular protocol;
after the first type of wireless connection with the external apparatus is established, supplying wireless information to the external apparatus via the second wireless interface using the first type of wireless connection, regardless of whether request information for requesting supply of the wireless information is obtained from the external apparatus, the wireless information being for establishing a particular wireless connection via the first wireless interface; and
establishing the particular wireless connection with the external apparatus via the first wireless interface using the wireless information after the wireless information is supplied to the external apparatus.

* * * * *